UNITED STATES PATENT OFFICE.

JAMES C. ANDERSON, OF HIGHLAND PARK, ILLINOIS.

METHOD OF INCRUSTING BRICK.

SPECIFICATION forming part of Letters Patent No. 401,098, dated April 9, 1889.

Application filed November 30, 1888. Serial No. 292,309. (No specimens.)

*To all whom it may concern:*

Be it known that I, JAMES C. ANDERSON, a citizen of the United States, residing at Highland Park, in the county of Lake and State of Illinois, have invented new and useful Improvements in the Method of Incrusting Brick; and I do hereby declare the following to be a full, clear, and exact description of said invention.

My invention relates to bricks, blocks, flooring-tiles, and other articles made from clays for use in the construction of buildings, &c., the object of my invention being to provide such articles with an integral overcrusting, which shall not only provide an effectual barrier to osmotic action incident to such articles when exposed to the weather on the outer walls of buildings, but a wearing-surface for the inner walls and floors of buildings to prevent the attrition incident to walls and the wearing incident to the floors, and to prevent the same from being marred, worn, or destroyed; and to this end I have succeeded in producing such articles the surfaces of which are covered with an incrusting envelope or shell of pure metals, said metals being fused onto and into the body of said clay articles so firmly as to become an integral part of the clay bodies into which the metallic crusting or shell is ingrafted, so that in practice and in fact there are no distinguishable lines between the metallic crust and the clay body at the points of union between said bodies, and no action incident to the use of such bricks, blocks, or tiles—such as exposure to the weather, attrition, or wear—can possibly disturb the point of union between the bodies so ingrafted, and the crust so provided presents as complete a weathering, attrition, and wearing surface as the various metals themselves out of which the crust is made, and much harder than if such metals were used in the shape of bars, plates, or blocks.

In producing bricks, blocks, tiles, &c., in accordance with my invention, I use the whole range of metals, either singly or in combination, for coating the blocks, selecting such of them as are best adapted for the purpose and uses to which they are applied—as, for instance, if I desire to provide the outer walls of a building with the metallic coating to resist the action of the weather and to prevent the moisture from entering from without into the walls of the building or the salts from the mortar from penetrating the walls of the building from the inner walls to the outer surface thereof, I prefer to use the softer metals and those that will present the greatest degree of ornamentation and be less liable to corrosion; and in like manner in providing a coating for the inside of the buildings I may use the metals more liable to corrosion, yet susceptible to a higher degree of ornamentation, and in coating or incrusting the blocks or tiles for the floors of the building I prefer to use aluminum, which metal is well known to resist to the fullest extent attrition by wear, such as the treading incident to floors, the treads of stairs, &c.; and although this metal is refractory in the highest degree I have succeeded in incrusting with said metals as effectually and as practicably as with the less refractory metals. The other hard metals, iron, zinc, copper, and tin, or the alloys of these or of other metals, may be used effectively for flooring purposes; but the aluminum, either alone or alloyed with other metals, may be used to the best advantage on account of its non-corrosive property, as well as its hardness. In fact, the whole range of metals or alloys may be used to give variable result in the coating as to character in wearing-surfaces as well as to æsthetic beauty.

In carrying out my invention the bricks, blocks, or tiles are by preference molded in the usual manner practiced by me in the manufacture of pressed building bricks, blocks, &c., molded from the dry clay, as described in various patents granted to me for such purposes. In the case of bricks, blocks, &c., it is understood that the articles to be coated are first molded or pressed into form in the usual manner ready to be placed in the kilns for burning; and while in this state, before any burning has taken place, or while they are being placed in the kilns for this purpose, I take the metals, of whatever kind desired, which have been previously prepared into a powdered, semi-powdered, or granulated condition, and sprinkle the same over the surface of the brick to be incrusted; or, if desired, the union of several metals may enter into combination, either as an alloy or as a distinctive ornamentation. I mix the powdered or granulated metals together and sprinkle the powder on the surfaces to be incrusted. Then the process of firing or burning takes place in the usual manner for converting such bricks or blocks from the clay state into that of pottery, which causes the powdered or granulated metals to become fused and incorporated with the clay body as an integral part thereof.

I have so far described a coating or crusting of the metals alone, singly, or in union with other metals; yet I do use advantageously with said metals, for rendering them more liquid and luminous, finely divided or powdered borax, such powdered borax being intermingled with the metallic powders; or I may use any of the metallic fluxes in the powdered state, commingled in like manner with the metals, and I may also use the various metallic oxides for giving the color-tints in ornamenting the articles.

In setting or placing the brick, block, or tile in the kilns, where the metals only are used for the incrustation, the bricks, blocks, or tiles may be placed one on the other, face to face, in the usual manner of setting such articles in the kilns for burning; but where the borax or other fluxes are used, which renders the metals more fluid, the bricks or blocks should be placed in seggars or upon shelves for burning with the face or incrusted part upward, so as to prevent the sticking or clinging together of the respective bricks or blocks.

In referring to the adaptability of the various metals for forming the incrustations for weather exposure and the liability of the lower grade or baser metal to corrosion and rust I do not wish to be understood as admitting the liability of the crust of facings to rust or corrode in the ordinary sense, when so deposited on the bricks, blocks, &c., for it is found to be in a state to resist such corrosion in the highest degree, and therefore the rust or corrosion referred to is meant relatively.

While I have described the application of the metals to the brick body to be fused as integral parts in the initial burning as the best mode known to me for producing the incrusted bricks, blocks, or tiles, yet I do not wish to be understood as confining myself to the initial burning. A partial result may be obtained in certain conditions in a secondary firing of the articles.

In an application filed by me of even date herewith, Serial No. 292,308, I have claimed the article, and such I do not claim here.

What I claim is—

An improvement in the art of manufacturing bricks, blocks, and tiles, which consists in applying finely divided or comminuted metals to the bricks, blocks, or tiles while the same are in a green or unburned state, and in then burning said articles to the pottery point to fuse the metal and cause it to form an incrustation or envelope of metal integral with the main body of the article.

In testimony whereof I affix my signature in the presence of two subscribing witnesses.

J. C. ANDERSON.

Witnesses:
   L. W. SINSABAUGH,
   H. M. STERLING.